United States Patent [19]

Cumming

[11] 4,146,116
[45] Mar. 27, 1979

[54] FRICTION BRAKE

[75] Inventor: James C. Cumming, Pleasant Ridge, Mich.

[73] Assignee: Rockwell International Corporation, Pittsburgh, Pa.

[21] Appl. No.: 833,616

[22] Filed: Sep. 15, 1977

[51] Int. Cl.² ............................................. F16D 55/46
[52] U.S. Cl. ................................... 188/71.5; 188/71.8
[58] Field of Search ................... 188/18 A, 71.4, 71.5, 188/72.4, 71.8, 170, 196 P, 366, 367

[56] References Cited

U.S. PATENT DOCUMENTS

| | | | |
|---|---|---|---|
| 2,384,297 | 9/1945 | Goepfrich | 188/71.8 |
| 2,823,770 | 2/1958 | Helvern | 188/71.5 |
| 3,680,666 | 8/1972 | Sommer | 188/71.5 |
| 3,946,837 | 4/1976 | Houser | 188/72.4 |

*Primary Examiner*—Duane A. Reger

[57] ABSTRACT

A friction brake is for a wheel which is mounted for rotation on an axle spindle and includes a backing plate mounted about an inward portion of the spindle. An annular hydraulic cylinder is removably secured to the backing plate and receives therein, in sliding engagement therewith, an annular piston which combine to form a hydraulic actuating device. A housing is secured to the backing plate for sealed encirclement of the wheel to define a cooling fluid chamber therebetween. An alternating arrangement of non-rotating discs, those mounted relative to the housing and backing plate, and rotating discs mounted relative to the hub are disposed within the cooling chamber between the housing and the actuating device. The selective introduction of hydraulic fluid to the actuating device applies force to the discs as they are entrapped against the housing to produce frictional contact therebetween to prevent rotation of the wheel.

14 Claims, 2 Drawing Figures

FRICTION BRAKE

BACKGROUND OF THE INVENTION

1. Field of the Invention

This invention relates to a friction brake and, more particularly, to such a brake which includes a plurality of discs and is hydraulically cooled.

2. Description of the Prior Art

There have heretofore been provided a number of friction brakes which utilize a plurality of discs and provide hydraulic oil for cooling the brake such as those disclosed in U.S. Pat. Nos. 2,823,770; 3,580,369 and 3,584,708. Although brakes of this type include a number of configurations and have been successfully utilized to provide reliable braking of a wheel mounted on an axle, there continues to exist a need for such brakes which are more reliable, easier to install and more accessible for repair.

SUMMARY OF THE INVENTION

It is, therefore, an object of this invention to provide a reliable friction brake which employs a plurality of hydraulically cooled discs and includes features which provide means for initial testing of various components thereof and for ease of assembly.

It is also an object to provide a friction brake of the type described which can be more readily and inexpensively repaired should it be required.

These and other objects of the invention are provided in a preferred embodiment thereof which includes a friction brake for a wheel which has a hub and is mounted for rotation around a central axis on an axle spindle. A backing plate is mounted about an inward portion of the spindle. An annular hydraulic cylinder is removably secured to the backing plate and has a generally L-shaped cross section to provide a first cylindrical surface thereon adjacent the backing plate which has a predetermined diameter. A second cylindrical surface on the cylinder is remote from the backing plate and concentric with the first surface and includes a diameter which is different from the predetermined diameter. An annular piston has an L-shaped cross section which is oppositely oriented with respect to the cylinder to be slidably received therein. A third surface on the piston is aligned with the first cylindrical surface and a fourth surface on the piston is aligned with the second cylindrical surface for respective sealed, sliding engagement therebetween. The piston and the cylinder define an operating chamber therebetween. There is provided means for selectively supplying hydraulic fluid to and removing it from the operating chamber to selectively position the piston relative to the cylinder. A housing is mounted to the backing plate for sealed encirclement of the hub to define a cooling fluid chamber. Non-rotating disc means are mounted relative to the housing for movement along the axis and rotation disc means are mounted relative to the hub for movement along the axis. The disc means are located within the cooling fluid chamber and are aligned with each other and between the housing and the piston for frictional contact therebetween for braking the wheel when the piston is positioned toward the housing. The invention also includes a method for installing the preferred embodiment.

DESCRIPTION OF THE PREFERRED EMBODIMENT

Figure 1:
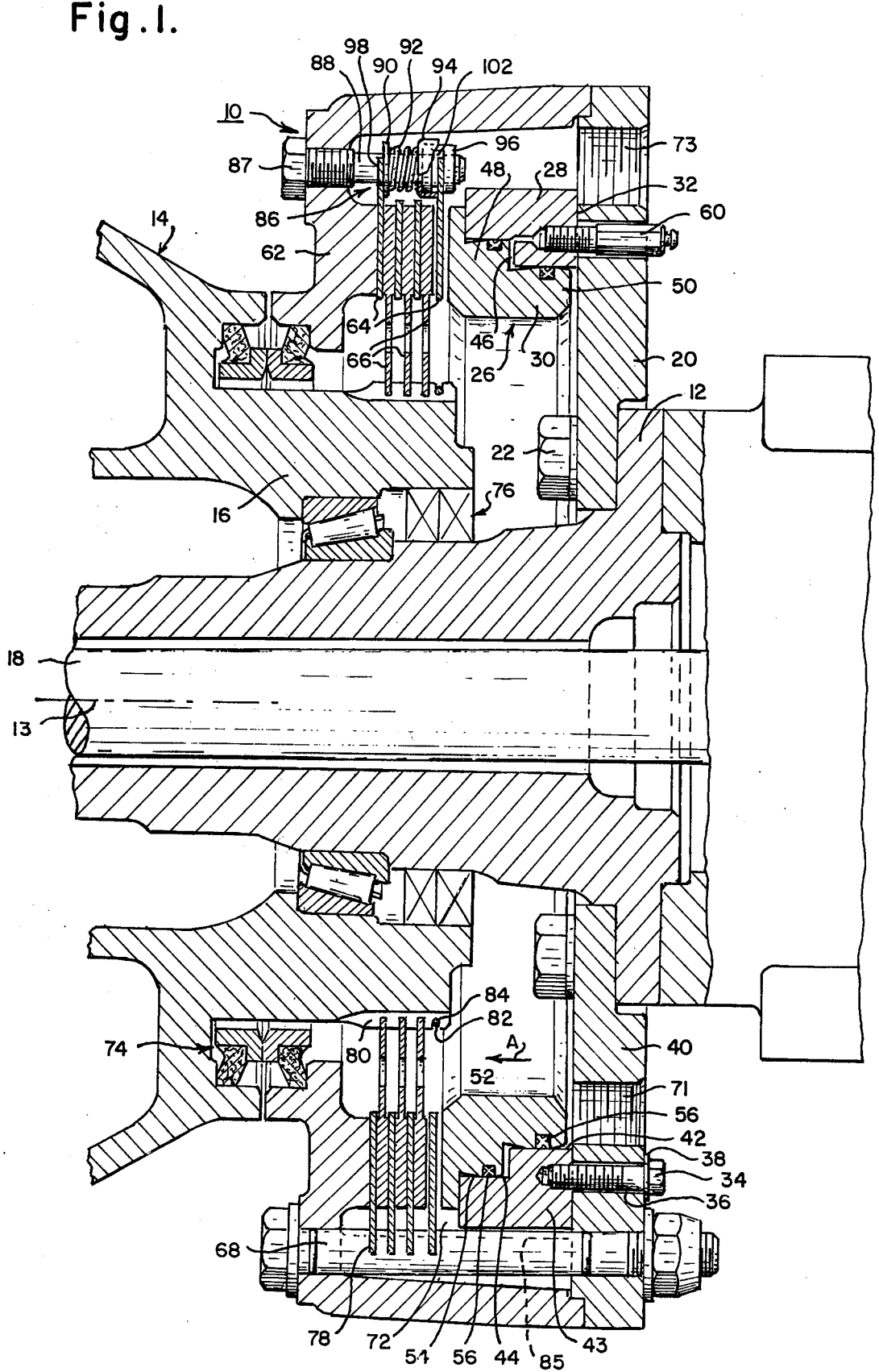
FIG. 1 is a sectional side view of the preferred embodiment of the invention as generally seen along the line 1—1 in FIG. 2.
Figure 2:
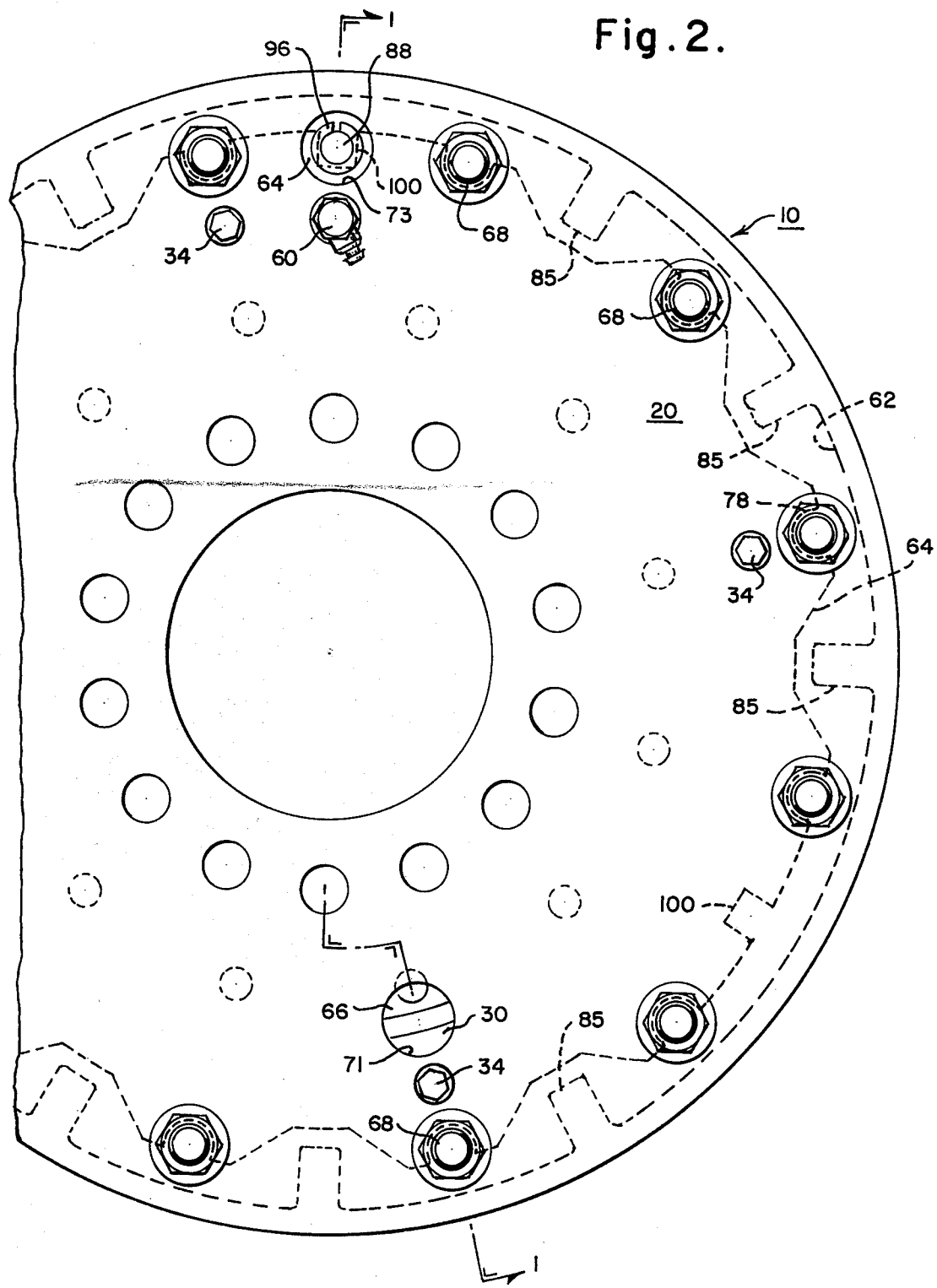
FIG. 2 is an elevated side view of the embodiment shown in FIG. 1.

As seen in FIGS. 1 and 2, a friction brake 10 is adapted to be installed on a spindle 12 of an axle to provide braking for a wheel 14 which is mounted for rotation about the spindle 12 and an axis 13 thereof. The wheel 14 includes a hub 16 and, in the preferred embodiment, is of the type which is driven by a drive axle 18 extending through the spindle 12. However, it should be clear that the present invention can be employed just as effectively in a configuration wherein the wheel is mounted for free rotation about an axle.

The brake 10 is generally of the type which includes a hydraulic actuating means which is designed to apply pressure to a plurality of disc brakes which are continuously cooled by a hydraulic cooling system. A first set of the discs is non-rotatably supported relative to the axle and a second set of discs, each of which is disposed between adjacent discs of the first set, is mounted for rotation with the wheel. When the operator desires to stop rotation of the wheel, hydraulic oil is provided to the hydraulic actuating means which, in turn, applies a force to the plurality of discs creating sufficient friction therebetween to stop rotation of the wheel about the axle.

The preferred brake 10 includes a backing plate 20 which extends generally perpendicular to the axis 13 and is mounted about an axially inward portion of the spindle 12. Specifically, in the preferred embodiment, the backing plate 20 is mounted by a plurality of bolts 22 to a flanged portion 24 of the spindle 12. However, it should be clear that a similar backing plate could be welded to the spindle or mounted thereon by any other suitable means.

The backing plate 20 generally provides support for the remainder of the brake 10 and includes openings therethrough for hydraulic actuating oil and hydraulic oil which is directed through the brake for cooling of the discs. The actuating means 26 of the preferred brake 10 includes an annular cylinder 28 and an annular piston 30 which piston 30 is mounted for movement in an axial direction when the brakes are applied.

The annular cylinder 28 has a generally L-shaped cross section and is mounted with its base 32 against the backing plate 20. The cylinder 28 is preferably mounted with four bolts 34 each of which extends through an opening 36 of the backing plate 20 ad includes a spring washer 38 which abuts the surface 40 of the backing plate 20. The significance of this configuration will be discussed further hereinbelow.

The annular cylinder 28 includes a pair of generally cylindrical surfaces 42, 44 which are respectively on a foot portion 43 and a leg portion 45 of the L-shaped cylinder 28 and are coaxially aligned with the axis 13. The diameter of the cylindrical surface 42 is less than the diameter of the cylindrical surface 40 and, accordingly, the annular cylinder 28 includes a radially extending surface 46 therebetween.

The piston 30 similarly is annular and includes an L-shaped cross section having a foot portion 48 and a leg portion 50. However, the piston 30 is oppositely disposed from the cylinder 28 so that the foot portion 48 is generally aligned with and overlies the leg portion 45 of the cylinder and the leg portion 50 overlies and is generally aligned with the foot portion 43 of the cylinder. A generally cylindrical surface 52 of the leg portion 50 has an effective diameter matching the diameter of the surface 42 and a generally cylindrical surface 54 of the foot portion 48 has an effective diameter matching the diameter of the surface 44 of the cylinder. Piston sealing rings 56 are provided between each of the matching surfaces 52 and 42 and 54 and 46 to insure that the hydraulic chamber 58 between the cylinder 28 and piston 30 is effectively sealed. The introduction of hydraulic oil to the chamber 58 will thus cause the piston 30 to move in a direction as shown by the arrow A for the introduction of force to the discs.

As thus described, the general configuration of the backing plate 20, cylinder 28 and piston 30 are similar to the configuration shown in U.S. Pat. No. 3,832,770. However, significantly, the configuration shown therein discloses that the cylinder should be integrally formed as a portion of the backing plate rather than their being provided as separate elements. The configuration of the present invention has the advantage of providing a separate cylinder-piston configuration which can be readily tested prior to installation remote from the spindle to insure its proper operation. This feature is of particular advantage if after extensive use of the brake it is found that wear of the cylinder and/or piston requires one or both elements to be remachined or replaced. Accordingly, repair or replacement of the actuating means 26 can be accomplished without removal of the backing plate 20 or any need for its replacement due to failure of another element.

Further, mounting the cylinder 28 to the backing plate 20 by bolts 34 which include a spring washer 38 allows the actuating means 26 to operate efficiently even if the backing plate 20 is subjected to slight distortions or warping during the operation of the axle. Distortion in the backing plate 20 will not be directly transmitted to the cylinder 28 which might impair braking efficiency.

The preferred actuating means 26 is also provided another feature not found in U.S. Pat. No. 2,832,770 which is intended to improve its reliability. It is possible because of the large diameter of the piston-cylinder configuration for shock, vibration or other outside forces to act on the piston 30 to cause it to become cocked within the cylinder 28 so that it is no longer axially aligned with the axis 13. If the generally mating cylindrical surfaces of the piston and the cylinder are provided with minimum clearance therebetween, it would be possible for the piston to become jammed within the cylinder, possibly impairing actuation. Therefore, the surfaces 52 and 54 of the annular piston 30, while having been previously described as generally cylindrical to match the adjacent surfaces of the cylinder 28, are in fact provided with a cross section which is slightly curved away from the adjacent surfaces of the cylinder 28 at opposite sides of each of the piston sealing rings 56. The surfaces 52 and 54 thus provide sufficient clearance between the piston 30 and the cylinder 28 to insure proper movement of the piston 30 by the introduction of hydraulic fluid through the fitting 60 to the chamber 58 since there would be no binding between the piston 30 and the cylinder 28. In other words, the primary "contact" between the piston 30 and the cylinder 28 will remain at the sealing rings 56 throughout operation of the brake 10 even if some cocking of the piston were to exist prior to actuation of the brake. It should be noted that this feature might also be employed on piston-cylinder configurations such as those shown in U.S. Pat. Nos. 3,580,369 and 3,584,708.

During initial installation of the brake 10, the backing plate 20, cylinder 28 and piston 30 are initially assembled and installed on the spindle 12 as described hereinabove. To complete the formation of the brake 10, an outer housing 62 and two sets of discs 64 and 66 are initially assembled on the hub 16. The outer housing 62 is adapted to be bolted by a plurality of bolts 68 to the backing plate 20 for sealed engagement therewith to generally define a pair of chambers 70 and 72 therebetween which receive hydraulic fluid for cooling of the brake during operation. In the preferred embodiment, cooling hydraulics are provided through an opening 73 in the backing plate 20 to provide the oil to the chamber 72 and cause it to flow around and through the discs 64 and 66 into the chamber 70. An outlet opening 71 is also provided through the backing plate 20 to allow the hydraulic oil to exit from the chamber 70 to be returned to the hydraulic cooling system (not shown) for eventual return to the chamber 72. It should be understood that the brake 10 might include an entirely self-contained hydraulic cooling system which would have no external components. Movement of the discs would cause sufficient flow between the chambers 70 and 72 to adequately cool them to improve their efficiency during braking. To insure that the brake 10 is effectively sealed and that the cooling fluid is retained therein in either type of cooling system, seals 74 and 76 are respectively installed between the outer housing 62 and the hub 16 and between the hub 16 and the spindle 12.

The plurality of friction discs 64 are disposed about the hub 16 in general alignment with the actuating means 26 and include a plurality of grooves 78 therein which mate with the bolts 68 to allow axial movement thereof but to prevent their rotation relative to the spindle 12. The plurality of discs 66 are mounted directly to the hub 16 by having an interior diameter which is splined to match a splined region 80 of the hub 16 so that the discs 66 will similarly be free to move axially relative to the hub 16 but will rotate therewith about the axis 13. Adjacent discs from the set of discs 64 and 66 are separated by a single disc from the other set to provide an array of alternating discs from each set. While the preferred embodiment therefore includes a plurality of discs as described hereinabove, it should be kept in mind that an effective brake can be provided which includes only one stationary disc and one rotating disc which are mounted for axial movement to produce friction therebetween upon movement of the actuating means 26.

Accordingly, as mentioned above, during initial installation the outer housing 62 is generally mounted about the hub 16 and the individual discs 64 and 66 are alternatively positioned about the hub 16 prior to installation of the bolts 68. It has been found that this form of installation is preferred over a form of installation which might include full assembly of the brake 10 on the spindle 12 prior to mounting of the wheel 14 on the spindle 12 as appears would be required by the installations shown in U.S. Pat. Nos. 3,580,369 and 3,584,708 if a backing plate were to be permanently secured to the spindle. Mounting the wheel 14 on the spindle 12 with the brake 10 installed would be very difficult because of trouble which would be encountered when trying to align the discs 66 with the splined region 80. While this alignment problem is eliminated by generally mounting the above mentioned portions of the brake 10 on the hub 16, there still exists the problem of insuring that the discs 66, which will generally hold the other elements in position, will remain on the splined region 80 as the outer housing 62 is being brought into contact with the backing plate 20 for final assembly. Accordingly, a circumferential groove 82 is formed in the splined region 80 and is adapted to receive a locking wire 84 therein after the discs 66 are properly positioned on the hub 16. The locking wire 84 is simply wrapped about the hub 16 with its terminal ends twisted together to insure that it will not be dislodged from the groove 82. The wire 84 and groove 82 have no function other than during installation and do not affect brake operation after the brake 10 is fully installed.

To further facilitate installation of the brake 10, one feature thereof includes the addition of ribs 85 to the interior of the housing 62. The ribs 85 generally extend axially toward the backing plate 20 and are located between the bolts 68. Although the installation instructions would specify the amount of torquing force to be applied to the bolts 68, it has been found that exceeding these limits could provide sufficient stress to the housing 62 to warp or deform it from its desired position relative the backing plate 20. Therefore, the ribs 85 provide additional resistance to this type of deflection, even if the recommended limits are exceeded during installation, to insure that the desired dimensions are maintained for proper operation of the brake 10.

As thus explained, one form of the brake 10 could be provided by simply including the elements described hereinabove. It would be possible to effectively prevent rotation of the wheel 14 about the spindle 12 by the introduction of hydraulic fluid to the actuating means 26. The resulting movement of the piston 30 in the direction A would generate a force between the discs 64 and 66 as they are entrapped between the piston 30 and the outer housing 62. The friction therebetween would be sufficient to stop rotation of the wheel 14 and would be generally uniform at all portions of the discs 64 and 66 even if the contact area on the outer housing 62 were not exactly perpendicular to the axis 13. Since the preferred piston 30 includes curved surfaces 52 and 54, it would be able to apply proper braking force to the discs even if slightly tilted to conform to the angle of the contact area. Relieving the pressure within the actuating means 26 would allow the piston 30 to be repositioned away from the discs to again allow wheel rotation.

However, in the preferred installation, a self-adjusting feature is provided in the form of a slack adjuster 86 which determines the relative spacing of the discs 64 during normal operation of the wheel 14 prior to actuation of the brake. The slack adjuster 86 includes, in the preferred embodiment, three equally circumferentially spaced bolt elements 87 which are mounted to the outer housing 62 and adapted to extend therethrough into the chamber 72. Each bolt 87, only one of which will be described since they all function in an identical manner, has an inward portion 88 thereof which has a uniform and continuous cylindrical surface and receives thereon a washer 90, a spring 92, a spring retainer 94 and a disc retainer 96. The washer, spring and spring retainer are free to move axially along the inward portion 88. However, the disc retainer 96 is a spring loaded collar device which is adapted for frictional engagement with the portion 88, requiring in the preferred embodiment about 100 pounds force to overcome friction to allow it to slide along the portion 88. The outermost disc 64 includes a peripheral groove 98 therein adapted to partially encircle the portion 88 for abutting contact with the washer 90. The innermost disc 64 is provided with a groove 100 at its outer periphery which is adapted to be received within a slot 102 in the disc retainer 96. The combined slot and groove configuration insures that there is sufficient engagement between the inner disc 64 and the disc retainer 96 throughout brake operation; in other words, to insure that slight radial movement of the disc relative the disc retainer 96 will not interfere with their engagement during brake operation. Additionally, the inner disc 64 is provided sufficient surface area about the disc retainer 96 to provide adequate contact for the spring retainer 94 to prevent it from being angularly displaced relative to the bolt 87.

Therefore, during operation of the slack adjuster 86 relative position is maintained between the inner and outer disc 64 by the combined action of the washer 90, spring 92 and the spring retainer 94 to cause them to be separated until the inner disc 64 makes abutting contact with the inner wall of the slot 102 of the disk retainer 96. The maximum force exerted by the spring 92 is about 50–60 pounds so that there is insufficient force produced to cause the disc retainer 96 to slide along the portion 88. During brake operation, the piston 30 will be caused to move toward the discs 64 to make initial contact with the inward disc 64. The hydraulic actuating force is quite sufficient to easily overcome the force created by the spring 92 so that the inner disc 64 is moved axially within the slot 102 as the spring retainer 94 compresses the spring 92. If no adjustment is required, axial force will be applied to the brake to generate frictional force and to prevent rotation of the hub 16. Release of the brakes will allow the spring 92 to reposition the inner disc 64 within the slot 102 as shown in FIG. 1.

However, should there exist sufficient wear to the discs 66 or the discs 64, actuation would begin as described above, but full contact between the discs would not be possible prior to the inner disc 64 making contact with the outer wall of the slot 102. Continued movement of the piston 30 would easily overcome frictional engagement between the disc retainer 96 and the portion 88 so that the disc retainer 96 would be axially repositioned at that location which would allow contact between the discs. Release of the brake would again allow the spring to reposition the inner disc 64 against the inner wall of the slot 102 preventing it from returning to its initial position. As a result, the movement of the disc retainer 96 along the portion 88 will establish the limiting positions for the inner disc 64 to prevent excessive movement of the disc during brake operation. Therefore, during normal operation the maximum movement of the inner disc 64 would be that distance required to move from one side of the slot 102 to the other side thereof.

While there has been shown and described hereinabove the preferred embodiment of the invention, it will now be obvious to those skilled in the art that changes and modifications may be made therein without departing from the claimed invention.

I claim:

1. A friction brake for a wheel which has a hub and is mounted for rotation around a central axis on an axle spindle comprising:

a backing plate mounted about an inward portion of said spindle;

an annular hydraulic cylinder removably secured to said backing plate, said cylinder having a generally L-shaped cross section and having a first cylindrical surface thereon adjacent said backing plate which has a predetermined diameter and a second cylindrical surface thereon remote from said backing plate which is concentric with said first cylindrical surface and includes a diameter which is different from said predetermined diameter to define a radial surface therebetween;

an annular piston having a L-shaped cross section which is oppositely oriented with respect to said cylinder to be slidably received therein with a third surface thereon aligned with said first cylindrical surface of said cylinder and a fourth surface thereon aligned with said second cylindrical surface of said cylinder for respective sealed, sliding engagement therebetween, said piston and said cylinder defining an operating chamber therebetween;

means for selectively supplying hydraulic fluid to and removing it from said operating chamber to selectively position said piston relative to said cylinder;

a housing mounted to said backing plate for sealed encirclement of said hub to define a fluid cooling chamber; and non-rotating disc means mounted relative to said housing for movement along said axis and rotating disc means mounted relative to said hub for movement along said axis, said disc means being located within said cooling fluid chamber and in alignment with each other and between said housing and said piston for frictional contact therebetween for braking said wheel when said piston is positioned toward said housing.

2. A friction brake as set forth in claim 1, wherein said cylinder is secured to said backing plate by spring means to allow relative movement of at least a portion of said backing plate relative to said cylinder during operation of said brake.

3. A friction brake as set forth in claim 1, wherein said cylinder is secured to said backing plate by a plurality of bolt means extending through said backing plate to be received within threaded holes in said cylinder.

4. A friction brake as set forth in claim 3, further including resilient spring means between said backing plate and a head of each of said bolt means.

5. An improved brake for a wheel which has a hub and is mounted for rotation about a central axis on an axle spindle, said brake being of the type which includes a housing rigidly extending from said spindle to encircle said hub for sealed engagement therewith to define a sealed annular chamber about said hub and said spindle, a pair of disc means coaxially aligned with said axis and aligned with each other and mounted within said chamber for movement along said axis, a first disc means of said pair being non-rotatable and mounted relative to said housing and a second disc means of said pair being rotatable and mounted relative to said hub, wherein said improvement comprises:

an annular hydraulic cylinder extending into said chamber in general alignment with said pair of disc means and including a pair of cylindrical surfaces which are coaxially aligned with said axis and have different diameters;

an annular piston having a pair of curved surfaces which are respectively aligned with said cylinder surfaces of said cylinder to include a portion thereon which makes sliding sealed engagement with its respective said cylinder surface;

means for selectively supplying hydraulic fluid to and removing it from an area between said piston and said cylinder for selective movement of said piston toward a wall of said housing to frictionally enage said pair of disc means therebetween; and each of such curved surfaces of said piston extends at opposite sides of said portion of curved surface away from its respective said cylindrical surface to provide clearance therebetween to allow some angular displacement of said piston relative to said axis without binding contact between said piston and said cylinder.

6. A brake as set forth in claim 5, wherein said portion of said curved surface includes sealing ring means to provide said engagement with said cylindrical surface.

7. A method of installing a friction brake on an axle spindle for a wheel which has a hub and is capable of being mounted for rotation about a central axis on said axle spindle, said hub having a splined, cylindrical area thereon which is coaxially aligned with said axis and said spindle having a region thereof which is inward of said hub when said wheel is mounted thereon, said method comprising:

attaching a backing plate to said region of said spindle;

attaching an annular cylinder to extend outwardly of said backing plate;

installing an annular piston within said cylinder;

mounting an outer housing on said wheel with sealing means therebetween to encircle said hub;

alternatively installing non-rotatable discs relative to said housing and rotatable discs on said splined portion of said hub to provide a stacked array of aligned discs;

mounting retaining means on said hub inwardly of said rotatable discs to prevent their accidental removal from said hub;

installing said wheel on said spindle;

securing said housing to said backing plate; and providing means for supplying hydraulic fluid to said cylinder for selective axial movement of said piston.

8. A method as set forth in claim 7, wherein said attaching of said backing plate includes bolting said backing plate to said region of said spindle.

9. A method as set forth in claim 7, wherein said attaching of said cylinder includes bolting said cylinder to said backing plate.

10. A method as set forth in claim 9, further including the step of installing resilient spring means on each of the bolts between a head thereof and said backing plate.

11. A method as set forth in claim 7, wherein said mounting said retaining means includes providing a circumferential groove about said splined portion and securing wire means thereabout.

12. A method as set forth in claim 7, wherein said securing of said housing to said backing plate includes bolting said housing to said backing plate.

13. A method as set forth in claim 12, further including providing a plurality of axially extending ribs to an interior wall of said housing to support said housing against distortion during said bolting.

14. An improved friction brake for a wheel which has a hub and is mounted for rotation about a central axis on an axle spindle, said brake being of the type which includes a housing mounted on an inward portion of said spindle to encircle said hub for sealed engagement therewith to define a sealed annular chamber about said hub and said spindle, a pair of disc means coaxially aligned with said axis and with each other and mounted within said chamber for movement along said axis, a first disc means of said pair being non-rotatable and mounted relative to said housing and a second disc means of said pair being rotatable and mounted relative to said hub, said first disc means including an outer disc and an inner disc with the remainder of said pair of disc means axially disposed therebetween, annular brake actuating means mounted within said chamber in alignment with said pair of disc means for selective application of force to said inner disc as said outer disc makes contact with an interior wall of said housing to produce frictional contact between said pair of disc means, said improvement comprising:

at least three cylindrical devices mounted to said housing to extend in an axlai direction into said chamber at generally equally circumferentially spaced locations about said inner disc and said outer disc;

each of said devices having biasing means mounted thereon which make contact with said inner and said outer discs tending to increase the distance therebetween;

a disc retainer mounted on said device to produce a predetermined frictional contact therebetween which is greater than a maximum force generated by said biasing means;

means for engaging said inner disc with said disc retainer to allow limited axial movement of said inner disc without causing said disc retainer to move along said device; and said actuating means being capable of supplying sufficient force to said inner disc to overcome said predetermined frictional contact and said maximum force to position said disc retainer on said device to establish the location of said limited axial movement of said inner disc within said chamber.

* * * * *